US009813484B2

(12) United States Patent
Bekiares et al.

(10) Patent No.: US 9,813,484 B2
(45) Date of Patent: Nov. 7, 2017

(54) METHOD AND APPARATUS ANALYSIS OF EVENT-RELATED MEDIA

(71) Applicant: MOTOROLA SOLUTIONS, INC, Schaumburg, IL (US)

(72) Inventors: Tyrone D. Bekiares, Park Ridge, IL (US); Steven D. Tine, Buffalo Grove, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 249 days.

(21) Appl. No.: 14/587,258

(22) Filed: Dec. 31, 2014

(65) Prior Publication Data
US 2016/0191607 A1    Jun. 30, 2016

(51) Int. Cl.
| | | |
|---|---|---|
| G06F 15/16 | (2006.01) | |
| H04L 29/08 | (2006.01) | |
| G06F 17/30 | (2006.01) | |
| H04N 7/18 | (2006.01) | |

(52) U.S. Cl.
CPC ........ *H04L 67/06* (2013.01); *G06F 17/30017* (2013.01); *G06F 17/30044* (2013.01); *H04L 67/10* (2013.01); *H04N 7/18* (2013.01)

(58) Field of Classification Search
CPC ................. G06F 3/0481; G06F 3/0484; G06F 17/30038; G06F 17/30017; G06F 17/30044; G06Q 10/101; G06Q 10/107; G06Q 30/0251; H04N 21/4756; H04L 29/06027
See application file for complete search history.

(56) References Cited

U.S. PATENT DOCUMENTS

| | | |
|---|---|---|
| 7,593,061 B2 | 9/2009 | Baumgartner et al. |
| 7,899,901 B1 | 3/2011 | Njemanze et al. |
| 8,184,154 B2 | 5/2012 | Estevez et al. |
| 8,205,244 B2 | 6/2012 | Nightingale et al. |
| 8,462,212 B1 | 6/2013 | Kundu et al. |

(Continued)

FOREIGN PATENT DOCUMENTS

| | | |
|---|---|---|
| EP | 1693801 A3 | 11/2006 |
| WO | 2008016360 A1 | 2/2008 |

OTHER PUBLICATIONS

The International Search Report and the Written Opinion, SN: PCT/US2015/066553, filed: Dec. 18, 2015, dated Mar. 30, 2016, all page.

*Primary Examiner* — Dustin Nguyen

(57) ABSTRACT

A communication system is provided that analyzes event-related media by correlating various media content based on the media being time-wise proximate to each other. Thereby, the communication system provides an informational tool for law enforcement agencies to correlate different media that all relate to a same event, such as subject matter media with related discussion media. For example, the subject matter media may comprise video, video stills, biometrics, sensor data, Automatic Vehicle Location (AVL) data, pictures, BOLO (Be On the LookOut) bulletins, and the like, while the related discussion media may comprise Push-to-Talk talkbursts, telephone conversations, Instant Messaging (IM), emails, and other forms of discussion media. By correlating such media, the communication system facilitates event or incident reconstruction by providing related media together when providing event or incident playback.

19 Claims, 4 Drawing Sheets

(56) References Cited

U.S. PATENT DOCUMENTS

| | | | | |
|---|---|---|---|---|
| 8,595,375 | B1* | 11/2013 | Kuznetsov | H04L 29/06027 |
| | | | | 709/219 |
| 9,256,343 | B1* | 2/2016 | Stekkelpak | G06F 3/0481 |
| 9,552,399 | B1* | 1/2017 | Browning | G06F 17/30554 |
| 2008/0177752 | A1* | 7/2008 | Kulkarni | G06F 17/30038 |
| 2009/0164512 | A1 | 6/2009 | Aizenbud-Reshef et al. | |
| 2010/0162392 | A1 | 6/2010 | Jeong et al. | |
| 2011/0093466 | A1 | 4/2011 | Kim et al. | |
| 2011/0196932 | A1* | 8/2011 | Jackson | G06Q 10/107 |
| | | | | 709/206 |
| 2012/0151345 | A1* | 6/2012 | McClements, IV | G06Q 10/101 |
| | | | | 715/716 |
| 2013/0004138 | A1* | 1/2013 | Kilar | H04N 21/4756 |
| | | | | 386/230 |
| 2014/0040258 | A1 | 2/2014 | Schwartz et al. | |
| 2014/0089801 | A1* | 3/2014 | Agrawal | G06F 3/0484 |
| | | | | 715/719 |
| 2014/0337126 | A1* | 11/2014 | Ohanyan | G06Q 30/0251 |
| | | | | 705/14.49 |

\* cited by examiner

METHOD AND APPARATUS ANALYSIS OF EVENT-RELATED MEDIA

FIELD OF THE INVENTION

The present invention relates generally to event-related media aggregation systems and, in particular, to a method and apparatus for analyzing event-related media.

BACKGROUND OF THE INVENTION

Public safety event-related communications are typically comprised of multiple intents of communications media. For example, one such intent of event-related communications media may be 'subject matter media.' Subject matter media is any modality of media which captures a portion of an event. Subject matter media is typically consumed by public safety personnel in an on-demand fashion. That is, some media may be watched or read by a public safety officer at a time that is convenient to the officer, as opposed to watching or reading the media live, that is, at the time the media is captured. For example, a public safety officer may review surveillance video, camera-captured images, documents, and public safety bulletins, for example, a BOLO (Be on the Lookout') bulletin, long after the media is captured or made available. Another intent of event-related communications media may be 'discussion media.' Discussion media is any modality of media which is used to discuss subject matter media. Discussion media, by its very nature, is consumed by public safety personnel in real time. For example, a public safety officer may participate in a Push-to-Talk group call, instant messaging, or a telephone call in real time to discuss certain subject matter media during incident response.

Generally, public safety agencies log or record all intents and modalities of event-related communications media. When the media is subsequently retrieved by a public safety practitioner for incident review, the media is displayed time-wise in a purely linear fashion, where media is arranged according to its time of capture. As noted, discussion media is often used to discuss on-demand subject matter media that was captured at a previous time. If logged media is presented linearly strictly according to time of capture, it becomes impossible to associate discussion media with the relevant subject matter media under discussion.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
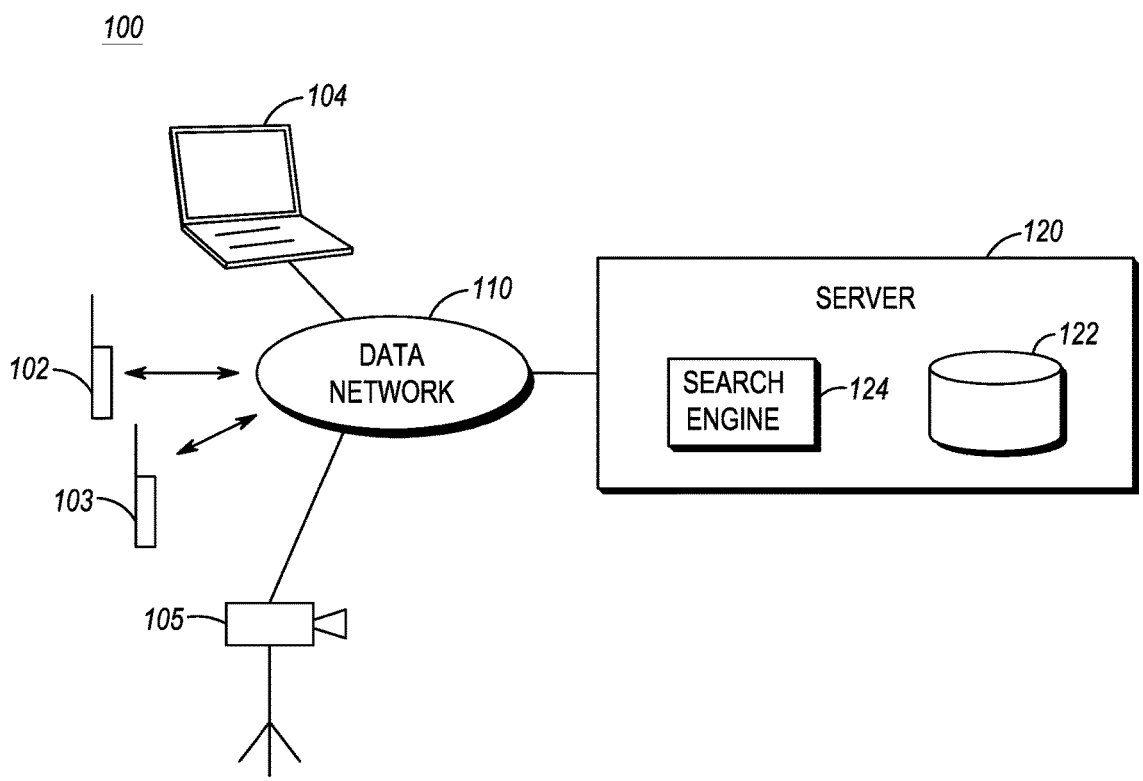
FIG. 1 is a block diagram of an exemplary communication system in accordance with an embodiment of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

A communication system is provided that analyzes event-related media by correlating various media content based on the media being time-wise proximate to each other. Thus, the communication system provides an informational tool for correlation of different media content that all relate to a same event, such as subject matter media with related discussion media. For example, the subject matter media may comprise video, video stills, biometrics, sensor data, Automatic Vehicle Location (AVL) data, pictures, BOLO (Be On the LookOut) bulletins, and the like, while the related discussion media may comprise Push-to-Talk talkbursts, telephone conversations, Instant Messaging (IM), emails, and other forms of discussion media. By correlating subject matter media and discussion media, communication system 100 facilitates event or incident reconstruction by providing related subject matter and discussion media together when providing event or incident playback.

Generally, an embodiment of the present invention encompasses a method for analyzing event-related media. The method includes determining that first media content has been stored in a media storage system, wherein the first media content is associated with a first time stamp; determining that the first media content was one or more of retrieved by a user or rendered to the user at a second time, wherein the second time is subsequent to the first time stamp; determining that the user, at a third time overlapping with or subsequent to the second time, conveyed second media content; determining, at a fourth time overlapping with or subsequent to the third time, a time offset between the second time and the third time; and when the time offset is less than a time offset threshold, associating the second media content with the first media content Another embodiment of the present invention encompasses a server comprising an interface, a processor, and an at least one memory device. The at least one memory device is configured to store a set of instructions that, when executed by the processor, cause the processor to perform the following functions: determine that first media content has been stored in a media storage system, wherein the first media content is associated with a first time stamp; determine that the first media content was one or more of retrieved by a user or rendered to the user at a second time, wherein the second time is subsequent to the first time stamp; determine that the user, at a third time overlapping with or subsequent to the second time, conveyed second media content; determine, at a fourth time overlapping with or subsequent to the third time, a time offset between the second time and the third time; and when the time offset is less than a time offset threshold, associate the second media content with the first media content.

Turning now to the drawings, the present invention may be more fully described with reference to FIGS. 1-5. FIG. 1 is a block diagram of an exemplary communication system 100 in accordance with some embodiments of the present invention. Communication system 100 includes multiple remote terminals 102-105, such as user terminals 102-104 (three shown) and one or more data capture devices 105 (one shown). Each remote terminal 102-105 is connected to a server 120 via a data network 110. Data network 110 may comprise a wide area network (WAN), a local area network (LAN), a telephone network such as a Public Switched Telephone Network (PSTN), the Internet, a privately operated data network such as an enterprise network, a wireless network such as a cellular network or a Wireless LAN (WLAN), a Public Safety network, or a combination of networks.

Server 120 may be any type of computer device that collects, logs, or records media of various modalities and intents. For example, Server 120 may comprise a Records Management System (RMS) or a Content Management System (CMS) utilized by public safety agencies. Server 120 includes an at least one media storage system 122 (one shown), for example, an event-related media database, that may be searched by user terminals 102-104. More particular, server 120 includes a server entity that may collect, process, and maintain data in media storage system 122, and further includes a search engine 124 that may search the media storage system, or other databases that may be internal or external to the server, in response to receiving a query from a user terminal 102-104 or an operator of the server. Server 120 may be connected to data network 110 via any of a wireless, wireline, or optical connection, or any other connection known in the art, and together server 120 and data network 110 may be referred to as an infrastructure of communication system 100. Media storage system 122 is a repository of event-related media, such as subject matter media and discussion media, for example, video recordings, audio recordings, emails, instant messaging (IM), tweets, and/or any other event-related media content. In other embodiments of the present invention, media storage system 122 may be external to, and in communication with, server 120. In still other embodiments of the present invention, there may be multiple media storage systems 122 (each storing different event-related media content) external to, and in communication with, server 120.

User terminals 102-104 may be any kind of user device into which a user may enter a data query and which includes a display for displaying results of that query. For example, each of user terminals 102-104 may be a wireless mobile device, such as a cellular telephone, a radio telephone, a smart phone, or a personal digital assistant (PDA) with radio frequency (RF) capabilities, may be a personal computer, a laptop computer, or a tablet computer with or without radio frequency (RF) capabilities, or may be a communication console, such as used in a computer-assisted dispatch (CAD) system or Real-Time Information Console (RTIC), for example, a Public Safety system. Data capture device 105 is an audio/video device that is capable of capturing ambient audio and/or video, such as a camera phone that may be used by a user to capture ambient audio and/or video and/or still images, or a camera or sensor such as microphone, etc., that may be mounted on a vehicle or on a suitable structure, such as a building or post. For example, each of user terminals 102-104 may operate as a data capture device.

Figure 2:
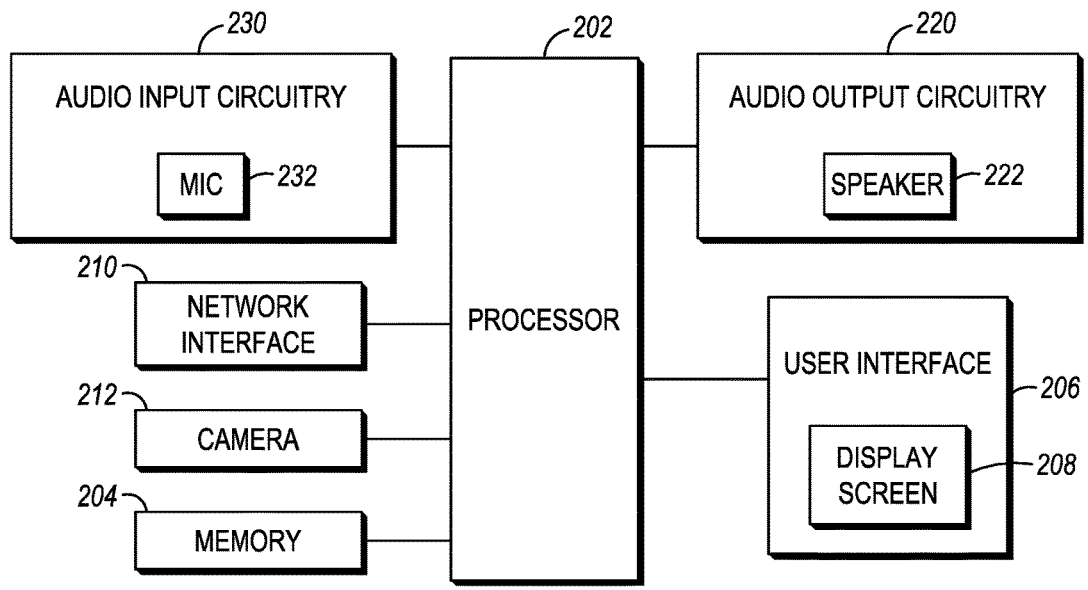
FIG. 2 is a block diagram of a user terminal of the communication system of FIG. 1 in accordance with some embodiments of the present invention.

Referring now to FIG. 2, a block diagram is provided of a user terminal 200, such as user terminals 102-104, in accordance with some embodiments of the present invention. User terminal 200 includes a processor 202, such as one or more microprocessors, microcontrollers, digital signal processors (DSPs), combinations thereof or such other devices known to those having ordinary skill in the art. The particular operations/functions of processor 202, and thus of user terminal 200, is determined by an execution of software instructions and routines that are stored in a respective at least one memory device 204 associated with the processor, such as random access memory (RAM), dynamic random access memory (DRAM), and/or read only memory (ROM) or equivalents thereof, that store data and programs that may be executed by the corresponding processor. However, one of ordinary skill in the art realizes that the operations/functions of processor 202 alternatively may be implemented in hardware, for example, integrated circuits (ICs), application specific integrated circuits (ASICs), a programmable logic device such as a PLD, PLA, FPGA or PAL, and the like, implemented in the user computer device. Based on the present disclosure, one skilled in the art will be readily capable of producing and implementing such software and/or hardware without undo experimentation.

User terminal 200 further includes a user interface 206 via which a user may input data into the user terminal or output data from the user terminal and a network interface 210 for connecting to data network 110, which user interface and network interface each is coupled to processor 202. Network interface 210 may be a wireless, wireline, or optical interface that is capable of conveying messaging, such as data packets, to, and receiving messaging from, the data network. User interface 206 includes a display screen 208 for displaying a data query and results of a corresponding data search, which display screen may or may not comprise a capacitive touchscreen, and further may include a keypad, buttons, a touch pad, a joystick, a mouse, an additional display, or any other device useful for providing an interface between a user and an electronic device such as user terminal 200. Display screen 208 may be a liquid crystal display (LCD), a light emitting diode (LED) display, a plasma display, or any other means for visually displaying information.

User terminal 200 further may include a camera 212 for capturing images and video, audio output circuitry 220 for audio output for listening by a user of the MS, and audio input circuitry 230 for allowing a user to input audio signals into the MS or to collect ambient audio noise. Audio output circuitry 220 includes a speaker 222 that receives the audio signals and allows audio output for listening by a user. Audio input circuitry 230 includes a microphone 232 that allows a user to input audio signals into the MS.

Figure 3:
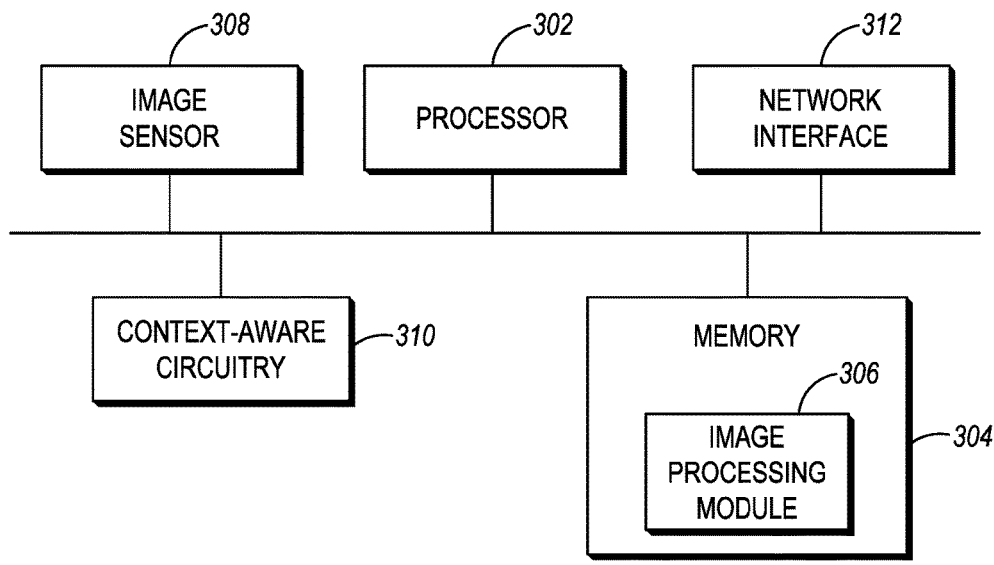
FIG. 3 is a block diagram of a data capture device of the communication system of FIG. 1 in accordance with some embodiments of the present invention.

Referring now to FIG. 3, a block diagram is provided of an exemplary data capture device 105 in accordance with some embodiments of the present invention. Data capture device 105 includes a processor 302 such as one or more microprocessors, microcontrollers, digital signal processors (DSPs), combinations thereof or such other devices known to those having ordinary skill in the art. Processor 302 may control the operation of data capture device 105 according to data and instructions stored in an at least one memory device 304, such as random access memory (RAM), dynamic random access memory (DRAM), and/or read only memory (ROM) or equivalents thereof, that stores data and programs that may be executed by processor 302 so that the data capture device may perform the functions described herein. Optionally, least one memory device 304 may further include an image processing module 306 comprising data and programs that, when executed by processor 302, are able to recognize a particular feature in a received image.

Data capture device 105 further includes an image sensor 308 and context-aware circuitry 310 that are each coupled to processor 302. Image sensor 308 electronically captures a sequence of video frames (that is, a sequence of one or more still images), with optional accompanying audio, in a digital format. Although not shown, the images or video captured by the image/video sensor 308 may be stored in the at least one memory device 304, or may be sent directly to a server 120 via a network interface 312. Context-aware circuitry 310 may comprise any device capable of generating information used to determine a current Field of View (FOV). During operation, context-aware circuitry 310 provides processor 302 with information needed to determine a FOV. Processor 302 then determines a FOV and provides the FOV to a server 120 via network interface 312. In a similar manner, processor 302 provides any image/video obtained by image sensor 308 a server 120 via network interface 312 for storage. However, in another embodiment of the present invention, data capture device 105 may have recording capabilities, for example, data capture device 105 may comprise a digital video recorder (DVR) wherein processor 302 stores images/video obtained by image sensor 308 in at least one memory device 304.

Figure 4:
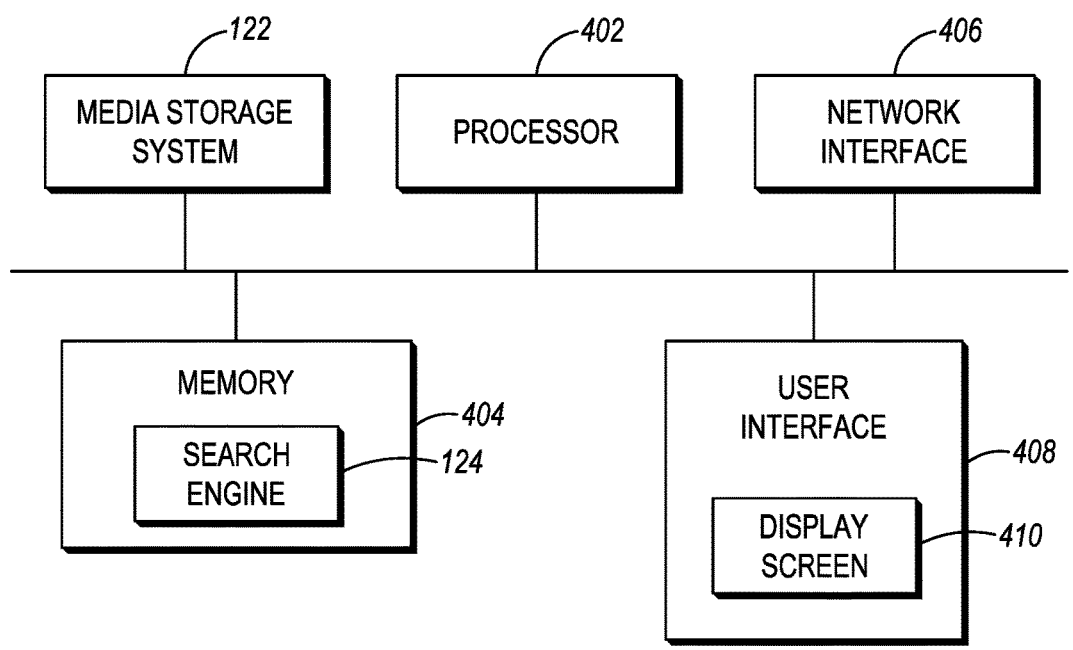
FIG. 4 is a block diagram of a server of the communication system of FIG. 1 in accordance with some embodiments of the present invention.

Referring now to FIG. 4, a block diagram is provided of server 120 in accordance with some embodiments of the present invention. Server 120 includes a processor 402 such as one or more microprocessors, microcontrollers, digital signal processors (DSPs), combinations thereof or such other devices known to those having ordinary skill in the art. Processor 402 may control the operation of server 120 according to data and instructions stored in an at least one memory device 404, such as random access memory (RAM), dynamic random access memory (DRAM), and/or read only memory (ROM) or equivalents thereof, that stores data and programs that may be executed by processor 402 so that the server may perform the functions described herein.

Server 120 further includes media storage system 122, which media storage system is in communication with processor 402 and which media storage system stores event-related media content captured, or downloaded, by a remote terminal. The event-related media content is stored in association with one or more attributes associated with the event-related media content. However, in another embodiment of the present invention, media storage system 122 may be maintained in an infrastructure element external to, and accessible, by the server. At least one memory device 404 includes search engine 122 comprising data and programs that, when executed by processor 402, is able to search media storage system 122 based on the attributes associated with the event-related media.

The event-related media content stored in media storage system 122 is stored in association with one or more attributes of the content. An event-related media content attribute may be any descriptor of the content that may be searched by a database search engine. For example, such attributes may be: a 'source,' that is, an identifier of a source (for example, a person or remote terminal) of the content; a 'content location,' that is, a location associated with the occurrence of an event depicted in the content (for example, any one or combination of location parameters, such as a discrete location like a jewelry store and or a pub, a street intersection, a city, or Global Positioning Satellite (GPS) coordinates); a 'source location,' that is, a location associated with the source when recording the content, a 'content time,' that is, a time associated with the occurrence of an event depicted in the content; a 'recording time,' that is, a time that the content was recorded or received by the server; a 'victim,' that is, a victim of an event depicted in the content; a 'perpetrator,' that is, a 'perpetrator' of an event depicted in the content; an 'event,' that is, the event associated with the content (for example, a concert, an athletic event, a car theft, a robbery, or a shooting). This list of attributes is provided to illustrate the principles of the present invention and is not intended to be a comprehensive listing of all attributes that may be associated with event-related media content.

Server 120 further includes one or more network interfaces 406 for connecting to data network 110 and, via the data network, to other devices of communication system 100, such as user terminals 102-104 and data capture device 105. Additionally, server 120 may include a user interface 408 via which an operator may input data into the server. Each of the one or more network interfaces 406 and user interface 408 is coupled to processor 402. The one or more network interfaces 406 may include a wireless, a wireline, and/or an optical interface that is capable of conveying messaging, such as data packets, to, and receiving messaging from, the data network. User interface 408 includes a display screen 410 for displaying a data query and results of a corresponding data search, which display screen may or may not comprise a capacitive touchscreen, and further may include a keypad, buttons, a touch pad, a joystick, a mouse, an additional display, or any other device useful for providing an interface between a user and an electronic device such as server 120. Display screen 410 may be a liquid crystal display (LCD), a light emitting diode (LED) display, a plasma display, or any other means for visually displaying information.

Figure 5:
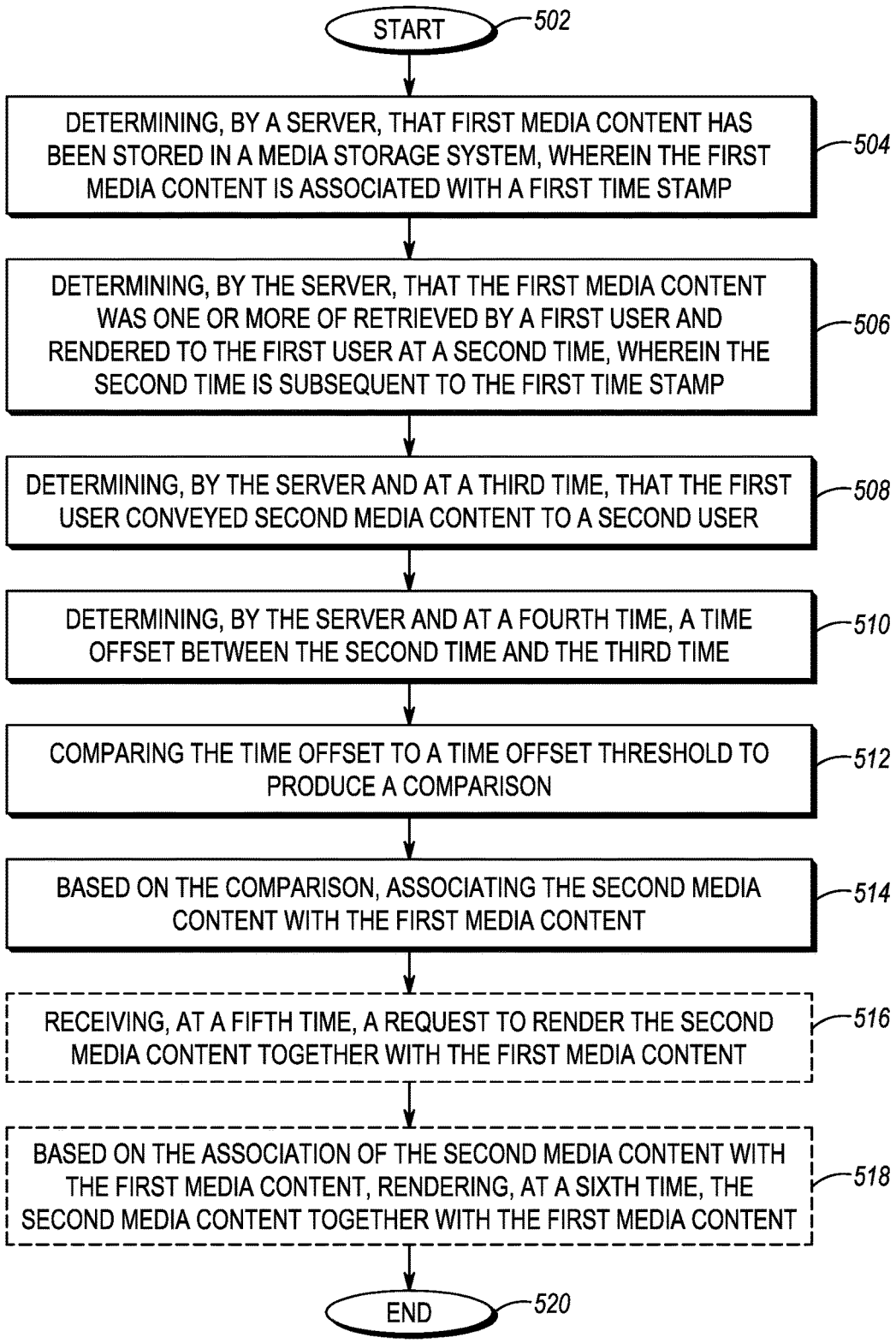
FIG. 5 is a logic flow diagram illustrating a method performed by communication system of FIG. 1 in analyzing event-related media accordance with some embodiments of the present invention.

Referring now to FIG. 5, a logic flow diagram 500 is provided that illustrates a method performed by communication system 100 in analyzing event-related media in accordance with some embodiments of the present invention. Logic flow diagram 500 begins (502) when server 120 determines (504) that first media content has been stored in media storage system 122, wherein the first media content is associated with a first time stamp.

That is, a first remote terminal, such as data capture device 105 or any of user terminals 102-104, captures and conveys to server 120, and the server receives from the remote terminal, first media content associated with an event, such as an emergency incident and/or criminal incident. For example, the first media content may be subject matter media such as video, video stills, biometrics, sensor data, Automatic Vehicle Location (AVL) data, pictures, BOLO (Be On the LookOut) bulletins, and the like. Further, the remote terminal may determine a time, that is, a first time, associated with the capturing of the first media content and convey a time stamp, indicating the time that the first media content was captured, to server 120. For example, the remote terminal may embed the time stamp in the first media content or may otherwise attach the time stamp to the first media content and convey the embedded or otherwise attached time stamp to server 120.

In response to receiving the first media content, server 120 generates a first time stamp associated with the received first media content and stores the first media content, in association with a first time stamp and an identifier of the event/incident, in media storage system 122. The first time stamp may be the time stamp received from the remote terminal along with the first media content, or may be a time stamp determined by server 120 and associated with a time at which the server received the first media content. Server 120 then determines that the first media content and associated first time stamp have been stored in media storage system 122 either during or after storing the first media content. For example, a determination by server 120 that the first media content and associated first time stamp have been stored in media storage system 122 may be implicit in server 120's storing of the first media content and the first time stamp in media storage system 122, or server 120 may determine that the first media content and associated first time stamp have been stored in media storage system 122 subsequent to the act of storing, and either before or after step 506 below, by confirming that the first media content and first time stamp are stored in media storage system 122.

The identifier of the event/incident comprises one or more attributes that may serve to identify the content. Further, the event-related media content stored in media storage system 122 may be stored in association with one or more other attributes that may serve to identify the content. An event-related media content attribute may be any descriptor of the content that may be searched by search engine 122. For example, such attributes may be: a 'source,' that is, an identifier of a source (for example, a person or a remote terminal 102-105) of the content; a 'content location,' that is, a location associated with the occurrence of an event depicted in the content (for example, any one or combination of location parameters, such as a discrete location like a jewelry store and or a pub, a street intersection, a city, or Global Positioning Satellite (GPS) coordinates); a 'source location,' that is, a location associated with the source when recording the content, a 'content time,' that is, a time associated with the occurrence of an event depicted in the content; a 'recording time,' that is, a time that the content was recorded or received by the server.

Server 120 further determines (506) that the first media content was one or more of retrieved by a first user associated with one or more of user terminals 102-104 and via the user's corresponding user terminal, such as user terminal 102, or rendered to the first user via the user's user terminal, at a second time, wherein the second time is subsequent to the first time stamp.

That is, at some point in time, server 120 receives, from the first user via the user's corresponding user terminal 102, a request to render the first media content (that is, subject matter media) to the first user. For example, the user may request to receive a playback of media content stored by the server, for example, a video clip or a video still. Accordingly, such a request may be received hours or day after the first media content was originally captured.

The request includes an identifier of the first media content, for example, one or more particular values for the associated attributes. For example, a value associated with a 'source' attribute may be an identifier (ID) of the source, such as a camera ID or a user terminal ID such as a mobile station ID (MS_ID) or a user equipment ID (UE_ID), a value associated with 'content location' or 'source location' attribute may be an intersection, a specific store, a store-type (e.g., a jewelry store), a neighborhood, a city, or GPS coordinates with respect to location. By way of another example, a value associated with a 'content time' or 'recorded time' attribute may be, for example, a time of day, a date, a month, and/or a year. By way of yet another example, a value associated with a 'source,' 'victim,' or 'perpetrator' parameter may be a name, a face, or any other identifier that may uniquely identify a person.

In response to receiving the request and based on the included identifier, server 120 retrieves the first media content from media storage system 122 and renders, that is, conveys, the first media content to the first user, that is, to user terminal 102. Further, server 120 determines, and stores in at least one memory device 404, a time, that is, the second time, at which the first media content was retrieved for and/or rendered to the user, which second time is subsequent to the first time and to the first time stamp.

Server 120 then determines (508), at a third time that overlaps with or is subsequent to the second time, that the first user conveyed second media content, such as text or audio, to the server and/or to another, second user. For example, the second media content may be discussion media related to the first media content, that is, the subject matter media, such as Push-to-Talk talkbursts, telephone conversations, Instant Messaging (IM), emails, and other forms of discussion media wherein a user may discuss the first media content. Server 120 then determines (510), at a fourth time that overlaps with or is subsequent to the third time, a time offset, that is, a difference in time, between the second time and the third time and compares (512) the difference/time offset to a time offset, or difference, threshold to produce a comparison. When the time offset is less than the time offset threshold, server 120 associates (514) the second media content (that is, the discussion media), conveyed by the first user at the third time, with the first media content (that is, the subject matter media), which was retrieved for and/or rendered to the first user at the second time, and logic flow 500 then ends (520). Notably, this association may take place at an appreciably later time, for example, at periodically scheduled processing times or at a time when a user requests rendering of a first or second media content (for example, step 516).

In other words, when the second media content is conveyed by the first user at a time that is proximate to, and more particularly within a time offset threshold of, the time of rendering of the first media content to the first user, the server determines that the second media content is related to the first media content and correlates, or associates, the first and second media content. For example, the second media content may be textual, audio, or email comments (discussion media) on the first media content, for example, a video (subject matter media), provided to the first user.

In various embodiments of the present invention, in associating the second media content with the first media content, server 120 may store, in one or more of at least one memory device 404 and media storage system 122, the second media content in association with an identifier of the first media content, may store an identifier of the second media content in association with the first media content, may store an identifier of the second media content in association with an identifier of the first media content, or may store any kind of association between the first media content and second media content that indicates that they are related to each other. For example, server 120 may store an association between the source ID and a time attribute (for example, the time stamp) associated with the first media content and a talkgroup ID (for example, the second media content may be sent to all members of talkgroup session) and a time attribute (for example, the third time) associated with the second media content. In another example, the first user may convey an implicit or explicit relationship between the first media content and the second media content by way of interaction with a first media content. For example, the first user may have the first media content displayed in a window receiving focus on his/her user terminal when generating second media content.

In other embodiments of the present invention, server 120 may associate the second media content with the first media content further based on detecting, in the second media content, a reference to the first media content. For example, the reference may be an explicit reference to the first media content, such as a reference to a media type of the first media content, for example, a video, or may be a reference to an attribute of the first media content, such as to an event, a person, or a location depicted in the first media content. In another example, a first user may verbally mention the first media content in the second media content. Server 120 may apply voice recognition technology known in the art to detect a verbal reference to the second media content, and generate an explicit association between the two media content. In still other embodiments of the present invention, based on the association of the second media content to the first media content, server 120 may, at a time subsequent to the third time and based on the association between the second media content and the first media content, render (518) the second media content together with the first media content. Such a rendering may or may not include an indication of a relationship between the first media content and the second media content, as such a relationship may be implicit in the rendering of the first and second media content together. For example, server 120 may receive (516), at a fifth time that is subsequent to the fourth time and from a third user, a request to render the first media content. In response to receiving the request and based on the stored indication that the first and second media content are related, server 120 then may render (518), at a sixth time, both the first media content and second media content to the third user. However, the rendering of both the first media content and second media content to the third user may or may not be responsive to a request from the third user. Thus, the third user may review the requested first media content, that is, the subject matter media, for example, a video captured at a given time, along second media content, that is, the discussion media, such as comments communicated via talkbursts, captured at a time subsequent to the first media content and stored by the server, which discussion media is related to the video.

Thus, by correlating various media content based on the media being time-wise proximate to each other, communication system 100 provides an informational tool, for example, for law enforcement agencies, to correlate different media intents that all relate to a same event, such as subject matter media with related discussion media. For example, the subject matter media may comprise video, video stills, biometrics, sensor data, pictures, BOLO (Be On the Look-Out) bulletins, or other such documents, while the related discussion media may comprise Push-to-Talk talkbursts, telephone conversations, Instant Messaging (IM), emails, and other forms of discussion media. By correlating such media content, communication system 100 facilitates event or incident reconstruction by providing related media together when providing event or incident playback In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of identifying and storing correlated first media content and second discussion media content associated with an event, the method comprising:
   receiving and storing, by a server computing device from a capture device, first media content in a media storage system, wherein the first media content is associated with a first time stamp, the first media content containing one or more of electronically captured image, video, and audio data;
   providing, by the server computing device, the first media content to a first user communication device at a second time, wherein the second time is subsequent to the first time stamp;
   subsequently determining, by the server computing device, that the first user communication device, at a third time overlapping with or subsequent to the second time, was caused to convey second discussion media content from the first user communication device to a second user communication device, the second discussion media content containing one or both of digital voice audio and text;
   receiving and storing, by the server computing device, the second discussion media content in the media storage system;
   determining, by the server computing device and at a fourth time overlapping with or subsequent to the third time, a time offset between the second time and the third time; and
   when the time offset is less than a time offset threshold, the server computing device storing an association indication indicating an association between the second discussion media content and the first media content.

2. The method of claim 1, wherein the first media content is video content.

3. The method of claim 1, wherein the first media content is stored in association with an identifier of an event captured by the first media content.

4. The method of claim 1, wherein storing an association indication indicating an association between the second discussion media content and the first media content comprises storing the second discussion media content with an identifier identifying the first media content.

5. The method of claim 1, further comprising:
   at a time overlapping with or subsequent to the fourth time, receiving, at the server computing device, a request for the first media content; and
   in response to receiving the request, the server computing device providing the second media content together with the first media content based on the stored association indication.

6. An infrastructure element for identifying and storing correlated first media content and second discussion media content associated with an event, the server comprising:
   a network interface;
   a processor; and
   an at least one memory device that is configured to store a set of instructions that, when executed by the processor, cause the processor to perform the following functions:
      receive and store first media content, from a capture device via the network interface, in a media storage system, wherein the first media content is associated with a first time stamp, the first media content containing one or more of electronically captured image, video, and audio data;
      provide, via the network interface, the first media content to a first user communication device at a second time, wherein the second time is subsequent to the first time stamp;
      subsequently determine that the first user communication device, at a third time overlapping with or subsequent to the second time, was caused to convey second discussion media content from the first user communication device to a second user communication device, the second discussion media content containing one or both of digital voice audio and text;
      receive, via the network interface, and store the second discussion media content in the media storage system;
      subsequently determine, at a fourth time overlapping with or subsequent to the third time, a time offset between the second time and the third time; and
      when the time offset is less than a time offset threshold, store an association indication indicating an association between the second discussion media content and the first media content.

7. The infrastructure element of claim 6, wherein the first media content is video content.

8. The infrastructure element of claim 6, wherein the first media content is stored in association with an identifier of an event captured by the first media content.

9. The infrastructure element of claim 6, wherein the at least one memory device is configured to store a set of instructions that, when executed by the processor, cause the processor to:
   store the second discussion media content with an identifier identifying the first media content.

10. The infrastructure element of claim 6, wherein the at least one memory device is configured to store a set of instructions that, when executed by the processor, cause the processor to:
    at a time overlapping with or subsequent to the fourth time, receive a request for the first media content; and
    in response to receiving the request, provide the second media content together with the first media content based on the stored association indication.

11. The method of claim 5, wherein storing an association indication indicating an association between the second discussion media content and the first media content comprises storing the first media content with an identifier identifying the second discussion media content.

12. The method of claim 5, wherein the first content is provided to the first user communication device at the second time by the server computing device responsive to the server computing device receiving a request from the first user communication device to provide the first media content.

13. The infrastructure element of claim 6, wherein the at least one memory device is configured to store a set of instructions that, when executed by the processor, cause the processor to:
    store the second discussion media content with an identifier identifying the first media content.

14. The infrastructure element of claim 6, wherein the at least one memory device is configured to store a set of instructions that, when executed by the processor, cause the processor to:
    store the first media content with an identifier identifying the second discussion media content.

15. The infrastructure element of claim 6, wherein the at least one memory device is configured to store a set of instructions that, when executed by the processor, cause the processor to:

receive, via the network interface, a request from the first user communication device to provide the first media content, and responsively provide the first media content to the first user communication device at the second time via the network interface.

16. The method of claim 5, wherein the second discussion media content is one of a push-to-talk (PTT) call, a telephone call, an instant message (IM), and an e-mail.

17. The method of claim 16, wherein the second discussion media content is one of the PTT call and the telephone call.

18. The infrastructure element of claim 6, wherein the second discussion media content is one of a push-to-talk (PTT) call, a telephone call, an instant message (IM), and an e-mail.

19. The infrastructure element of claim 6, wherein the second discussion media content is one of the PTT call and the telephone call.

\* \* \* \* \*